US012626941B2

(12) United States Patent
Mehrazi et al.

(10) Patent No.: US 12,626,941 B2
(45) Date of Patent: May 12, 2026

(54) ELECTROCHEMICAL CELL DEGRADATION MONITORING METHOD AND SYSTEM

(71) Applicant: Robert Bosch GmbH, Stuttgart (DE)

(72) Inventors: Shirin Mehrazi, Sunnyvale, CA (US); Bjoern Stuehmeier, Sunnyvale, CA (US); Jonathan Braaten, Sunnyvale, CA (US); Lei Cheng, Sunnyvale, CA (US); Nathan Craig, Sunnyvale, CA (US); Christina Johnston, Spanish Fort, AL (US)

(73) Assignee: Robert Bosch GmbH, Stuttgart (DE)

( * ) Notice: Subject to any disclaimer, the term of this patent is extended or adjusted under 35 U.S.C. 154(b) by 685 days.

(21) Appl. No.: 18/119,528

(22) Filed: Mar. 9, 2023

(65) Prior Publication Data

US 2024/0304841 A1 Sep. 12, 2024

(51) Int. Cl.
*H01M 8/04664* (2016.01)
*G01N 17/02* (2006.01)
*G01N 27/02* (2006.01)

(52) U.S. Cl.
CPC ........ *H01M 8/04664* (2013.01); *G01N 17/02* (2013.01); *G01N 27/026* (2013.01)

(58) Field of Classification Search
CPC .......... H01M 8/04313; H01M 8/04664; G01N 17/02; G01N 27/026
See application file for complete search history.

(56) References Cited

U.S. PATENT DOCUMENTS

2007/0259256 A1\* 11/2007 Le Canut .......... H01M 8/04835
320/134
2012/0276466 A1 11/2012 Sinha et al.

FOREIGN PATENT DOCUMENTS

CN 115498217 A 12/2022
CN 115602891 A 1/2023
KR 20200020566 A 2/2020
WO WO 2016-071801 \* 5/2016

OTHER PUBLICATIONS

Makharia, R. et al., "Measurement of Catalyst Layer Electrolyte RESistance in PEFCs Using Electrochemical Impedance Spectroscopy," Journal of The Electrochemical Society, vol. 152, No. 5, Apr. 1, 2005, pp. A970-A977.\*

(Continued)

*Primary Examiner* — Brittany L Raymond
(74) *Attorney, Agent, or Firm* — Brooks Kushman P.C.

(57) ABSTRACT

An electrochemical cell degradation monitoring method. The method includes applying first and second bias potentials to an electrode of an electrochemical cell during an operating state thereof. The method further includes measuring impedance spectra of the electrode of the electrochemical cell during the operating state biased to the first and second bias potentials. The method also includes determining a deviation in the impedance spectra at the first and second bias potentials. The method determines a degradation state of the electrode of the electrochemical cell in response to the deviation in the impedance spectra at the first and second bias potentials of the electrode of the electrochemical cell.

22 Claims, 7 Drawing Sheets

(56) References Cited

OTHER PUBLICATIONS

Ferreira, P.J. et al., "Instability of Pt/C Electrocatalysts in Proton Exchange Membrane Fuel Cells," Journal of The Electrochemical Society, vol. 152, No. 11, Oct. 7, 2005, pp. A2256-A2271, DOI: 10.1149/1.2050347.

Makharia, R. et al., "Measurement of Catalyst Layer Electrolyte Resistance in PEFCs Using Electrochemical Impedance Spectroscopy," Journal of The Electrochemical Society, vol. 152, No. 5. Apr. 1, 2005, pp. A970-A977, DOI: 10.1149/1.1888367.

Wang, H. et al., "A review of DC/DC converter-based electrochemical impedance spectroscopy for fuel cell electric vehicles," Renewable Energy, vol. 141, 2019, pp. 124-138, https://hal.science/hal-02299957.

* cited by examiner 22    24

18    14    12    16    20

10

ELECTROCHEMICAL CELL DEGRADATION MONITORING METHOD AND SYSTEM

TECHNICAL FIELD

The present disclosure relates to an electrochemical cell (e.g., a fuel cell) degradation monitoring method and system. The degradation monitoring method and system may determine a degradation state (e.g., a depleted catalyst region in an electrode of a fuel cell) by on-line analysis of an electrochemical impedance response of a fuel cell or stack.

BACKGROUND

Integrating a proton exchange membrane fuel cell (PEMFC) stack into vehicles (e.g., medium-duty and heavy-duty vehicles) is being explored in the transportation section to electrify operation of the vehicles. One component of a fuel cell is a membrane electrode assembly (MEA). The MEA includes a cathode catalyst layer, an anode catalyst layer, and a proton exchange membrane (PEM) sandwiched therebetween. Achieving durability of the cathode catalyst layer of the MEA has been a challenge and represents a hurdle to widespread commercialization of PEMFCs for transportation applications. The lack of durability also presents a major cost driver.

The cathode catalyst layer may include a catalyst material (e.g., platinum and/or platinum-based catalyst) on a support (e.g., carbon support) and a proton conducting ionomer. The cathode catalyst layer may be subject to different forms of degradation (e.g., load cycling during operation, air/air starts after long shutdown periods, local fuel starvation events, and operation under extreme environmental conditions). There remains a need to characterize these forms of degradation to enhance the durability of the cathode catalyst layers and allow for state-of-health determination during operation.

SUMMARY

According to one embodiment, an electrochemical cell degradation monitoring method is disclosed. The method includes applying first and second bias potentials to an electrode of an electrochemical cell during an operating state thereof. The method further includes measuring impedance spectra of the electrode of the electrochemical cell during the operating state biased to the first and second bias potentials. The method also includes determining a deviation in the impedance spectra at the first and second bias potentials. The method determines a degradation state of the electrode of the electrochemical cell in response to the deviation in the impedance spectra at the first and second bias potentials of the electrode of the electrochemical cell.

In another embodiment, an electrochemical cell degradation monitoring method is disclosed. The method includes applying first and second bias potentials to an electrode of an electrochemical cell during an operating state at a first number of cycles, measuring impedance spectra of the electrode of the electrochemical cell during the operating state biased to the first and second bias potentials, and determining a first characteristic of the impedance spectra at the first and second bias potentials. The method further includes applying the first and second bias potentials to the electrode of the electrochemical cell during the operating state at a second number of cycles, measuring the impedance spectra of the electrode of the electrochemical cell during the operating state biased to the first and second bias potentials, and determining a second characteristic of the impedance spectra at the first and second bias potentials. The method also includes determining a degradation state timing of the electrode of the electrochemical cell in response to the first and second characteristics. While proton resistivity at the different bias potentials may be used to identify a deviation (and therefore, the presence of a degradation state), other metrics may also be used (e.g., a change in capacitance from carbon corrosion).

In yet another embodiment, an electrochemical cell degradation monitoring system is disclosed. The system includes an electrochemical cell including an electrode, a direct current/direct current (DC/DC) converter, and an electrochemical impedance spectrometer. The DC/DC converter is configured to apply first and second bias potentials to the electrode of the electrochemical cell during an operating state thereof. The electrochemical impedance spectrometer is configured to measure impedance spectra of the electrode of the electrochemical cell during the operating state biased to the first and second bias potentials. A deviation in the impedance spectra at the first and second bias potentials are indicative of a degradation state of the electrode.

DETAILED DESCRIPTION

Figure 1:
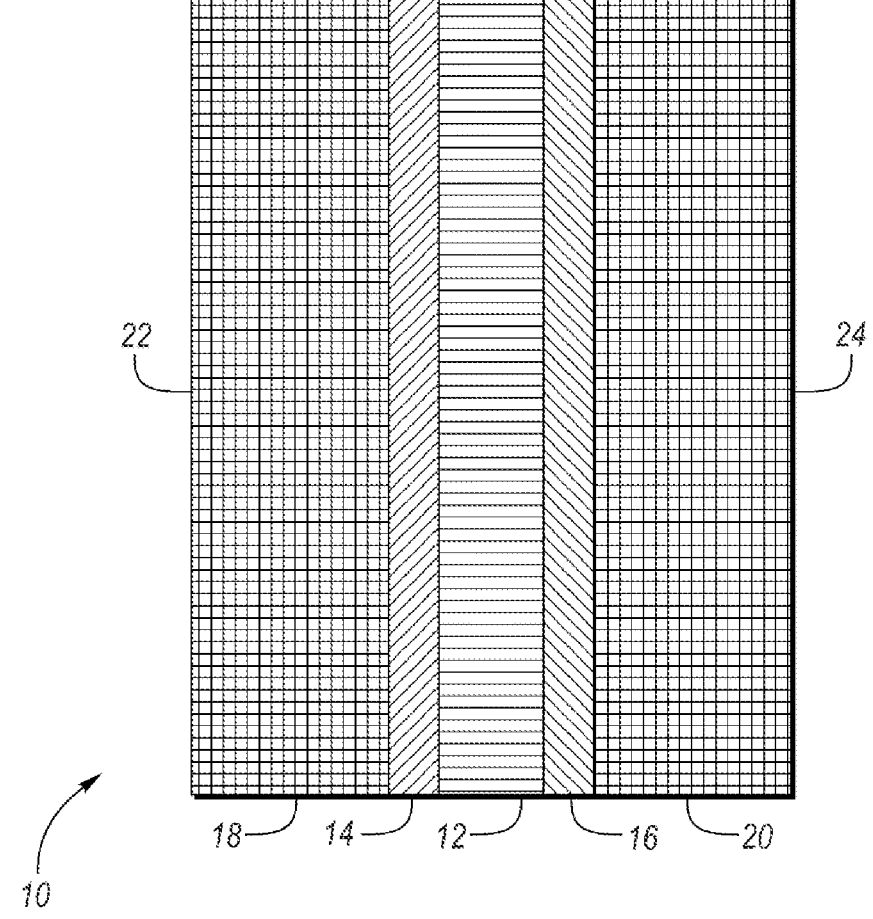
FIG. 1 depicts a schematic, side view of a membrane electrode assembly of an electrochemical cell (e.g., a fuel cell, a proton exchange membrane fuel cell (PEMFC), electrolyzer, a carbon dioxide electrochemical conversion device, etc.).

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within +5% of the value. As one example, the phrase "about 100" denotes a range of 100±5, i.e., the range from 95 to 105. Generally, when the term "about" is used, it can be expected that similar results or effects according to the invention can be obtained within a range of +5% of the indicated value. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A", the term also covers the possibility that B is absent, i.e., "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Degradation of the cathode catalyst layer in a proton exchange membrane fuel cell (PEMFC) reduces the durability and commercial viability of PEMFCs for use in vehicles and the transportation sector. During load cycles of the PEMFC, catalyst material dissolution and redeposition may occur. This type of degradation may lead to particle coarsening, platinum deposition in the proton exchange membrane (PEM), and/or the formation of a platinum depletion layer adjacent to the PEM.

These forms of degradation may result in a loss of electrochemically active surface area (ECSA) and/or through-plane inhomogeneity of the catalyst layer. The loss of ECSA may result in additional kinetic and mass transport losses and thus a decrease in fuel cell and fuel cell stack performance. During air/air starts, the carbon support of the cathode electrode may be corroded leading to a thinning of the cathode electrode and additional mass transport resistances and thus performance losses. Further, hot and/or dry operation may result in the chemical and mechanical degradation of the ionomer in the membrane and electrodes, which may increase the proton conduction resistances and hydrogen crossover, which may result in additional performance losses.

While current proposals may be able to detect a decrease in performance of a PEMFC, current proposals do not identify the origin of the losses in performance due to different forms of degradation. What is needed is an electrochemical cell (e.g., PEMFC) degradation monitoring method and system that can determine a specific degradation state in a membrane electrode assembly (MEA) (e.g., a depleted catalyst region in an electrode of a fuel cell).

In one or more embodiments, an electrochemical cell degradation monitoring method and system is disclosed. The method and system may determine a specific degradation state in an MEA in response to a proton resistance of an electrode in the MEA (e.g., a cathode).

The degradation monitoring methods and systems of one or more embodiments may be applied to a proton exchange membrane fuel cells (PEMFCs) or other electrochemical cells. During operation of a PEMFC, the cathode catalyst layer may age due to one or more types of degradation (e.g., metal dissolution, metal redeposition, carbon corrosion, and/or ionomer degradation). One or more embodiments disclose methods and systems for monitoring degradation in an electrochemical cell using impedance-based measurements during operation of the electrochemical cell (e.g., normal operation cycles and/or maintenance cycle operation). The electrochemical cell monitoring methods and systems may combine impedance measurements under various conditions (e.g., various potentials) to decouple the individual contributions of catalyst surface area loss, catalyst gradient formation, carbon corrosion, or catalyst layer compaction, and/or ionomer degradation from each other.

FIG. 1 depicts a schematic, side view of membrane electrode assembly (MEA) 10 of an electrochemical cell (e.g., a fuel cell, a proton exchange membrane fuel cell (PEMFC), electrolyzer, a carbon dioxide electrochemical conversion device, etc.). The electrochemical cell including MEA 10 may be stacked to create an electrochemical cell stack (e.g., a fuel cell stack or an electrolyzer stack). MEA 10 includes proton exchange membrane (PEM) 12, anode catalyst layer 14, cathode catalyst layer 16 and first and second gas diffusion layers (GDLs) 18 and 20. PEM 12 may be formed of a polymer material, an alkaline solution, and/or a solid ceramic material. PEM 12 may include an ionomer material.

Anode catalyst layer 14 may include an anode catalyst material supported on an anode catalyst support. Cathode catalyst layer 16 may include a cathode catalyst material supported on a cathode catalyst support. The anode and cathode catalyst materials may be platinum and/or a platinum-based catalyst. The anode support and the cathode support may be formed of a carbon support material. Anode catalyst layer 14 and/or cathode catalyst layer may include a catalyst material (e.g., a platinum-based catalyst), a catalyst support (e.g., a carbon support), and an ionic polymer or ionomer binder. The anode and/or cathode may be referred to as electrodes of the electrochemical cell.

PEM 12 is situated between anode catalyst layer 14 and cathode catalyst layer 16. Anode catalyst layer 14 is situated between first GDL 18 and PEM 12 and cathode catalyst layer 16 is situated between second GDL 20 and PEM 12. First GDL 20 contacts the surface of anode catalyst layer 14 opposing PEM 12. Second GDL 20 contacts the surface of cathode catalyst layer 16 opposing PEM 12. First and second sides 24 and 26 of MEA 10 may be bounded by first and second flow fields (not shown), respectively.

When the electrochemical cell is an electrolyzer, an oxygen evolution reaction (OER) occurs at anode catalyst layer 14 and a hydrogen evolution reaction (HER) occurs at cathode catalyst layer 16 with $H^+$ ions flowing across electrolyte membrane 16 from anode catalyst layer 14 to cathode catalyst layer 16.

When the electrochemical cell is a fuel cell, the first flow field supplies $H_2$ to MEA 10 and the second flow field supplies air or $O_2$ to MEA 10. The catalysts of the anode catalyst layer 14 and cathode catalyst layer 16 are responsible for a hydrogen oxidation reaction (HOR) and an oxygen reduction reaction (ORR), respectively. An ionomer material in PEM 12 is configured to transport protons from anode catalyst layer 14 to cathode catalyst layer 16. An ionomer material in anode catalyst layer 14 and cathode catalyst layer 16 is configured to transport protons to and from PEM 12.

Figure 2:
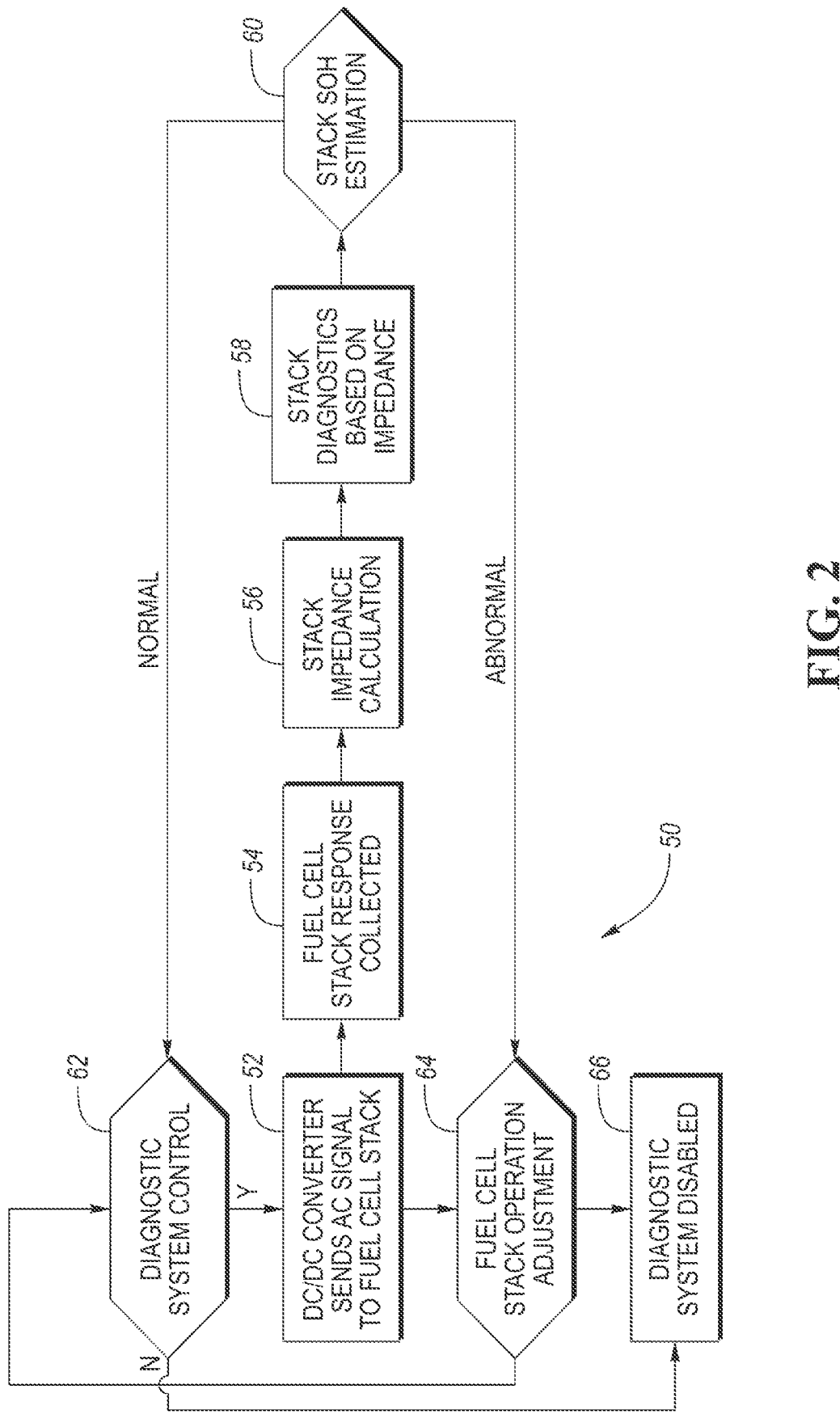
FIG. 2 depicts a schematic of a flowchart of a fuel cell stack monitoring method using a direct current/direct current (DC/DC) converter and electrochemical impedance spectroscopy (EIS) based techniques.

FIG. 2 depicts a schematic of flowchart 50 of a fuel cell stack monitoring method using a direct current/direct current (DC-DC) converter and electrochemical impedance spectroscopy (EIS) based techniques with a spectrometer device. The use of EIS-based techniques may aid in the decoupling of individual performance loss contributions when each of these contributions are frequency dependent. The EIS-based techniques may be integrated with DC-DC converters in a fuel cell system. The DC-DC converter may be configured to apply an alternating current (AC) signal to a fuel cell stack.

As shown in step 52 of flowchart 50, a DC-DC converter sends an AC signal to a fuel cell stack. As shown in step 54 of flowchart 50, a fuel cell stack response is collected in response to sending the AC signal to the fuel cell stack. As shown in step 56 of flowchart 50, an impedance of the fuel cell stack is calculated in response to the fuel cell stack response. As shown in step 58 of flowchart 50, fuel cell stack diagnostics are performed in response to the calculated impedance of the fuel cell stack.

As shown in step 60 of flowchart 50, a fuel stack state of health (SOH) is estimated in response to the fuel cell stack diagnostics. The SOH estimation may be normal or abnormal. If the SOH estimation is normal, then the fuel cell stack monitoring method proceeds to decision block 62. If the SOH estimation is abnormal, then the fuel cell stack monitoring method proceeds to decision block 64.

Decision block 62 of flowchart 50 determines whether the diagnostic system of the fuel cell stack is under control or not. If the diagnostic system of the fuel cell stack is under control, then step 52 and subsequent steps are repeated. If the diagnostic system of the fuel cell stack is not under control, then step 66 is performed. Step 66 disables the diagnostic system. Decision block 64 of flowchart 50 determines an adjustment to the operation of the fuel cell stack in response to the SOH estimation and its value being abnormal. After decision block 64 is performed, the fuel cell stack monitoring method proceeds to decision block 62 as shown in FIG. 2.

In one or more embodiments, a fuel cell degradation monitoring method uses a DC-DC converter in a fuel cell vehicle (e.g., PEMFC vehicle) to measure electrochemical impedance during operation of the fuel cell under first and second conditions (e.g., first and second potentials) and to obtain a proton sheet resistance ($R_P$) to a heterogeneity in a catalyst (e.g., platinum) distribution within the electrode (e.g., cathode electrode) of one or more fuel cells in a fuel cell stack. The $R_P$ may be indicative of a through-plane proton transport in an electrode (e.g., a cathode electrode) of one or more fuel cells in a fuel cell stack. In one or more embodiments, the fuel cell degradation monitoring method may be performed in-situ the vehicle fuel cell stack, thereby avoiding tear down of the fuel cell stack, which may result in inoperability of the stack.

The measurement of the proton sheet resistance may be realized by potentiostatic electrochemical impedance spectroscopy by a DC-DC converter in a fuel cell stack. The use of the DC-DC converter to detect aging in a PEMFC is enabled by correlating the proton transport resistance obtained from impedance measurements under two or more applied potential conditions.

$R_P$ may be calculated from a forty-five-degree (45°) section in the impedance according to a transition line model for a porous electrode. $R_P$ may be obtained by recording a full electrochemical impedance spectrum and calculated using the transition line model of the porous electrode. In one or more embodiments, the proton transport resistance correlation to a degree of degradation is specific to the MEA used in the fuel cell.

Figure 3:
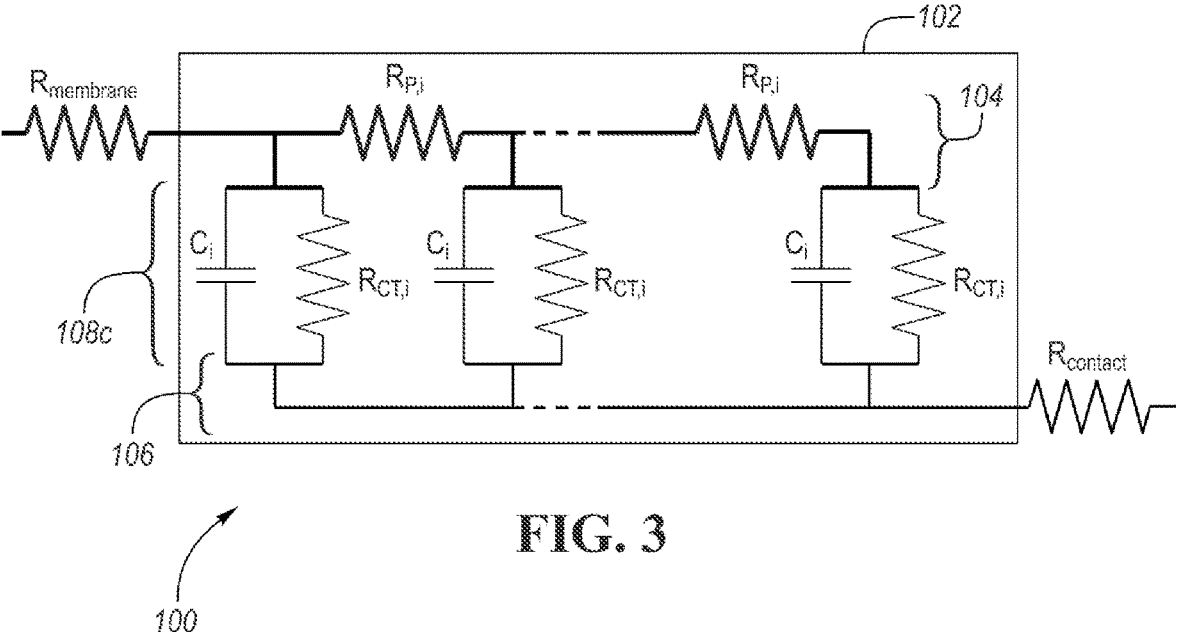
FIG. 3 is a schematic diagram of a transition line model of a porous electrode.

FIG. 3 is a schematic diagram of transition line model 100 of porous electrode 102. Ionic current paths (e.g., purely ionic current paths) are depicted by shaded lines in region 104. Electronic current paths (e.g., purely electronic current paths) are depicted by shaded lines in region 106. The transition between the ionic current paths in region 104 and electronic current paths in region 106 are depicted by shaded lines in region 108. As shown in FIG. 3, $R_{membrane}$, $C_i$, $R_{CT,i}$, $R_{P,i}$, and $R_{contact}$ refer to the membrane resistance, the capacitance, the charge transfer resistance, the proton sheet resistance, and the electrical contact resistance. The total resistance may be determined by the sum of the individual segments i.

In one or more embodiments, the fuel cell degradation monitoring method assumes that the distributed contributions of $R_{P,i}$, $C_i$, and $R_{CT,i}$ are homogeneously distributed in a through-plane direction of an electrode of the fuel cell (e.g., in beginning-of-life electrodes). However, as the electrode ages during operation, the homogeneity is no longer observed due to a catalyst (e.g., platinum) depletion layer that forms close to the membrane. The capacitance has contributions from the support surface (e.g., carbon support surface) and the catalyst (e.g., platinum) surface. The significance of these distributions is potential dependent due to pseudo-capacitive effects on the catalyst (e.g., platinum) surface, namely hydrogen underpotential deposition (e.g., in a range of 0 to 0.35V) and catalyst (e.g., platinum) oxidation (e.g., in a range of 0.7 to 1.2V).

Figure 4A:
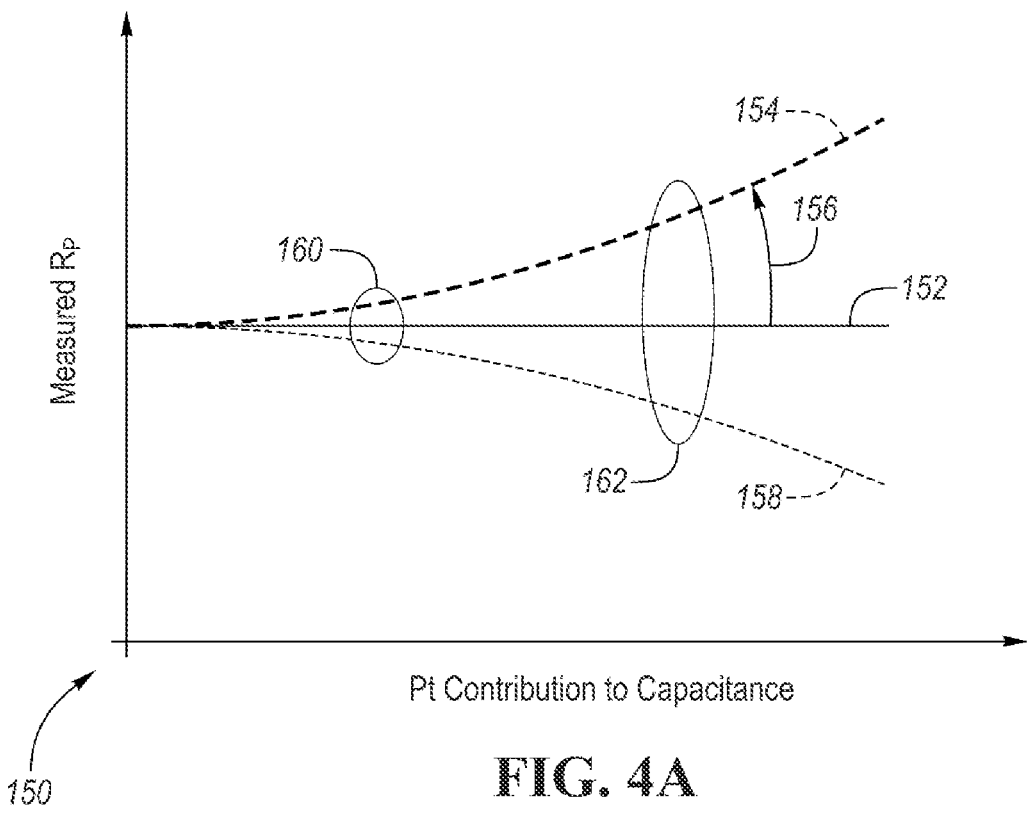
FIG. 4A depicts a graph showing an example of using first and second measurements with a varying extent of catalyst (e.g., platinum) contribution to an overall capacity to determine an extent of a catalyst depletion layer.
Figure 4B:
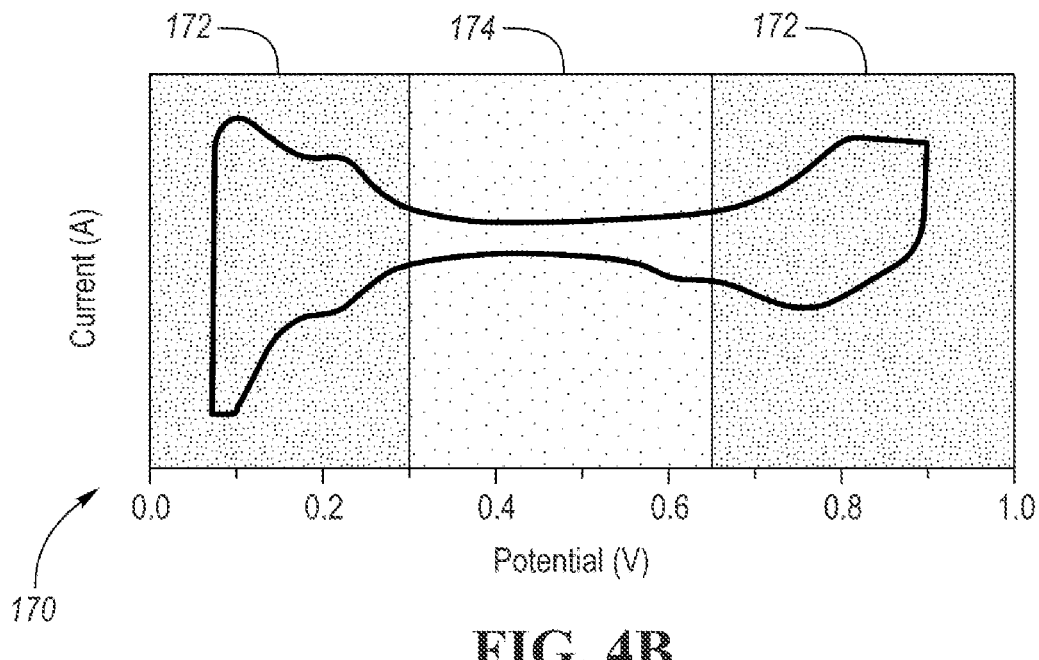
FIG. 4B depicts a cyclic voltammogram of a catalyst/support (e.g., platinum/carbon) showing regions with high contributions of catalyst to the overall measurable capacitance and regions with low contributions of catalyst to the overall measurable capacitance.

With a non-uniform catalyst (e.g., platinum) distribution caused by aging and/or an uneven deposition, the capacitive contributions to the impedance spectra from the catalyst (e.g., platinum) surfaces at potentials in these ranges may induce a breakdown of a mathematical extraction of $R_P$ from the transmission line approximation. The extent of this change from an initial state of uniform catalyst (e.g., platinum) distribution (e.g., beginning-of-life distribution) in the electrode depends on the extent of the aging and the measurement conditions (e.g., potential). By combining measurements where the catalyst (e.g., platinum) contribution to the capacitance is low (e.g., in a range of 0.3 to 0.65V) (e.g., the first measurement shown in FIG. 4A) and measurements at potentials where the catalyst (e.g., platinum) contribution is high (e.g., at potentials below 0.3V or above 0.65V) (e.g., the second measurement shown in FIG. 4A), the extent of the catalyst (e.g., platinum) depletion layer formation can be determined as shown in FIGS. 4A and 4B. Aging of the catalyst may be detected by correlating the measured proton transport resistance under these two conditions. The overall aging due to load cycles may be determined based on the extent of catalyst (e.g., platinum) depletion layer formation.

In one or more embodiments, these measurements may be achieved during operation at low load (e.g., a high operating potential) and high load (e.g., an operating potential of about 0.6V) by utilizing the DC-DC converter. Alternatively, these measurements may be achieved during a maintenance cycle of a fuel cell system with hydrogen fuel gas supplied to the anode and an inert gas (e.g., $N_2$ or Ar) supplied to a cathode and a bias potential applied in these ranges.

FIG. 4A depicts graph 150 showing an example of using two measurements with a varying extent of catalyst (e.g., platinum) contribution to an overall capacity to determine an extent of catalyst depletion layer formation. Graph 150 plots measured $R_P$ as a function of platinum contribution of capacitance. First measurement 160 is made using a relatively low platinum contribution as described herein. Second measurement 162 is made using a relatively high platinum contribution as described herein. Line 152 represents a homogeneous catalyst layer. Curve 154 represents a platinum depletion near the membrane of the fuel, with the increase in measured $R_P$ indicating aging of the fuel cell as represented by arrow 156. Curve 158 represents a platinum concentration near the membrane.

FIG. 4B depicts cyclic voltammogram 170 of catalyst/support (e.g., platinum/carbon) showing regions 172 with high contributions of catalyst to the overall measurable capacitance and regions 174 with low contributions of catalyst to the overall measurable capacitance.

In one or more embodiments, a shift (e.g., a significant shift) to a lower $R_P$ under both applied potentials may indicate support corrosion (e.g., carbon corrosion), thereby indicating a thinning of an electrode that leads to lower proton conduction resistances. A shift (e.g., a significant shift) to a higher $R_P$ under both applied potentials may indicate ionomer degradation.

Figures 5A, 5B, 5C, 5D:
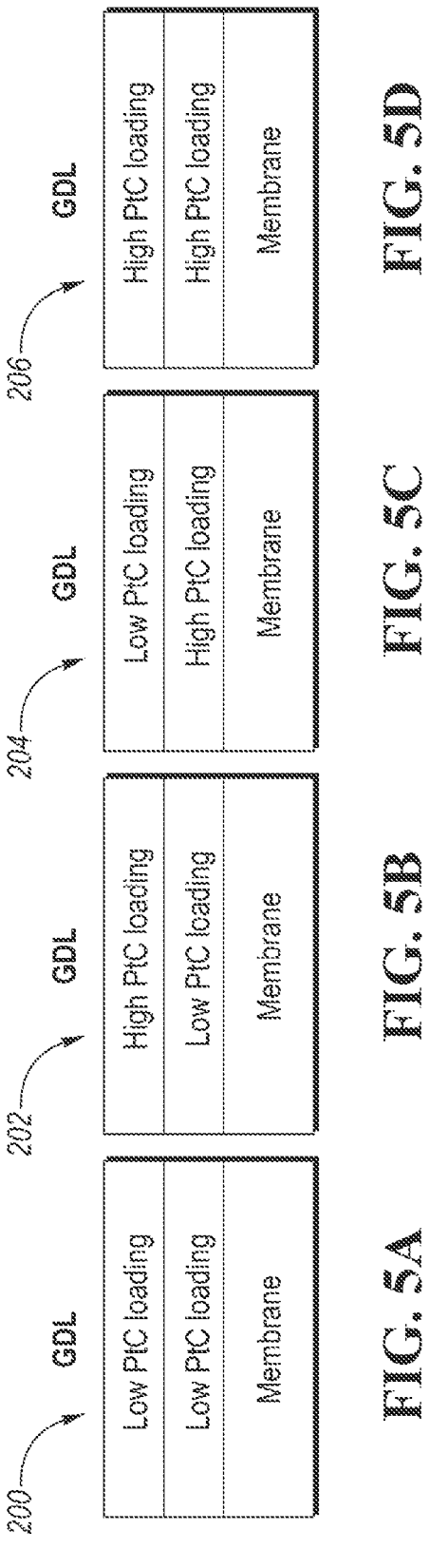
FIG. 5A depicts a schematic of a cathode electrode having a Low-Low bilayer cathode electrode configuration.
FIG. 5B depicts a schematic of a cathode electrode having a Low-High bilayer cathode electrode configuration.
FIG. 5C depicts a schematic of a cathode electrode having a High-Low bilayer cathode electrode configuration.
FIG. 5D depicts a schematic of a cathode electrode having a High-High bilayer cathode electrode configuration.

In one or more embodiments, bilayer cathode electrodes were prepared to validate the effect of an inhomogeneous platinum distribution on the measured $R_P$. Each electrode layer of each bilayer cathode electrode configuration includes a low platinum loading of 10% (referred to as "Low") or a high platinum loading of 40% (referred to as "High"). Each possible configuration was prepared. FIG. 5A depicts a schematic of cathode electrode 200 having a Low-Low configuration. FIG. 5B depicts a schematic of cathode electrode 202 having a Low-High configuration. FIG. 5C depicts a schematic of cathode electrode 204 having a High-Low configuration. FIG. 5D depicts a schematic of cathode electrode 206 having a High-High configuration. The first descriptor indicates the layer adjacent to a proton exchange membrane (PEM) and the second descriptor indicates the layer adjacent to a gas diffusion layer (GDL) and distant from the membrane.

In the examples shown in FIGS. 5A through 5D, the electrodes all contained the same amount of proton conducting ionomer resulting in identical proton conductivities in all the cases. Observed differences in the measured proton conduction resistance are a result of varied platinum distribution in the electrodes as described in FIGS. 5A through 5D.

Figure 6B:
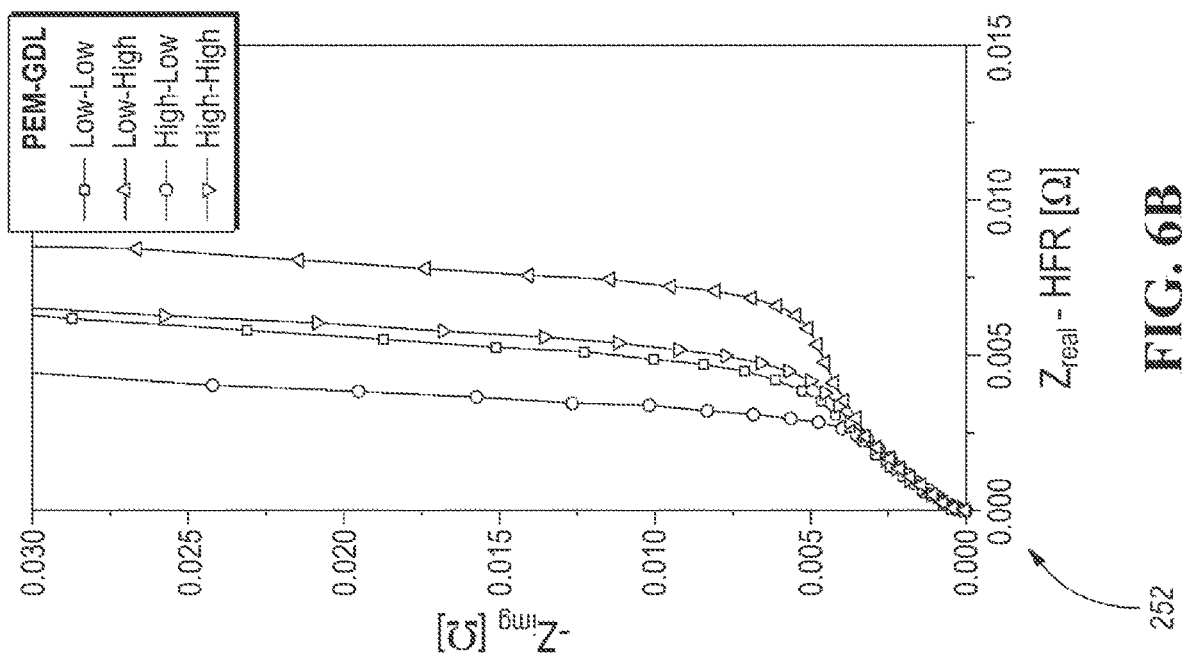
FIG. 6B depicts a graph of an example of a second measurement at 0.20V with a high platinum contribution.
Figure 6A:
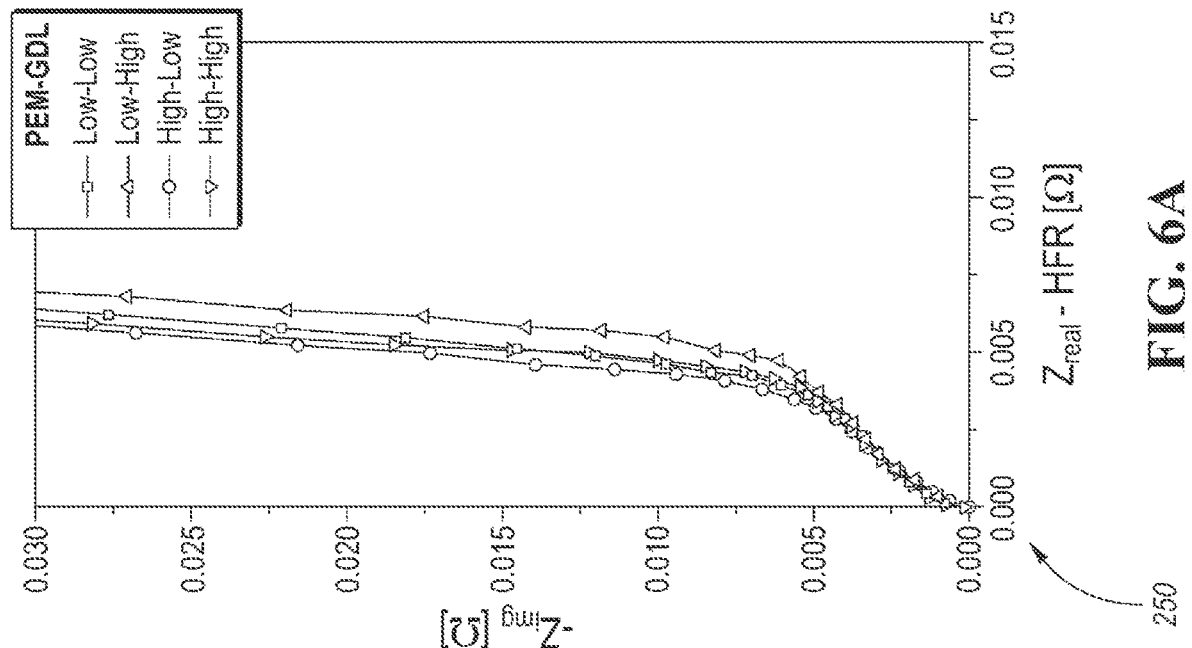
FIG. 6A depicts a graph of an example of a first measurement at 0.45V with a low platinum contribution.

FIGS. 6A and 6B depict graphs of potentiostatic impedance measurements of the bilayer electrodes shown in FIGS. 5A through 5D. FIG. 6A depicts graph 250 of an example of a first measurement at a low platinum contribution at 0.45V. FIG. 6B depicts graph 252 of an example of a second measurement at a high platinum contribution at 0.20V. The potentiostatic impedance spectra of the bilayer electrodes are recorded under $H_2/N_2$ conditions at 0.45V (FIG. 6A) and 0.2V (FIG. 6B). The real portion of the impedance is shifted by the high frequency (HFR) that corresponds to the membrane and contact resistances.

The proton transport resistance ($R_P$) may be estimated from a shift in the real part of the impedance measured at two or more alternating current (AC) frequencies. The proton transport resistance ($R_P$) may be obtained from the about forty-five-degree (45°) section in the impedance spectrum between the y-intercept and the transition to capacitive effects (increasing imaginary part ($Z_{img}$) with limited increase in the real part of the impedance ($Z_{real}$), at almost vertical lines). As shown in FIGS. 6A and 6B, $R_P$ is proportional to the change in $Z_{real}$ between the y-intercept and the transition to the almost vertical behavior.

For the first measurement with a small contribution of platinum to the overall capacitance of the system at 0.45V, all bilayer electrodes show very similar impedance spectra as expected from the identical proton conductivities in the electrodes.

For the second measurement with a high contribution of platinum to the overall capacitance of the system, a significant spread in the obtained $R_P$ values is observed. In one or more embodiments, the measured $R_P$ does not depend on the total capacitance of platinum but only on the distribution of the capacitance in the through-plane direction. This is shown by the essentially identical spectra of the Low-Low (squares) and High-High (downwards triangles) samples that have vastly different platinum loadings and thus capacitances but are both homogeneous electrodes and thus show the same measured $R_P$ that is a function of the identical proton conductivity of the ionomer in the electrodes. The electrodes with two different platinum concentrations and therefore a step function in the capacitance show a deviation in the impedance behavior compared to the homogeneous electrodes. For the electrode with the lower platinum concentration adjacent to the membrane (Low-High, upwards triangles) that is representative of an aged electrode with a platinum depletion layer, a significant increase in $R_P$ is observed. This behavior can be used to determine the formation of a depletion layer.

Figure 7B:
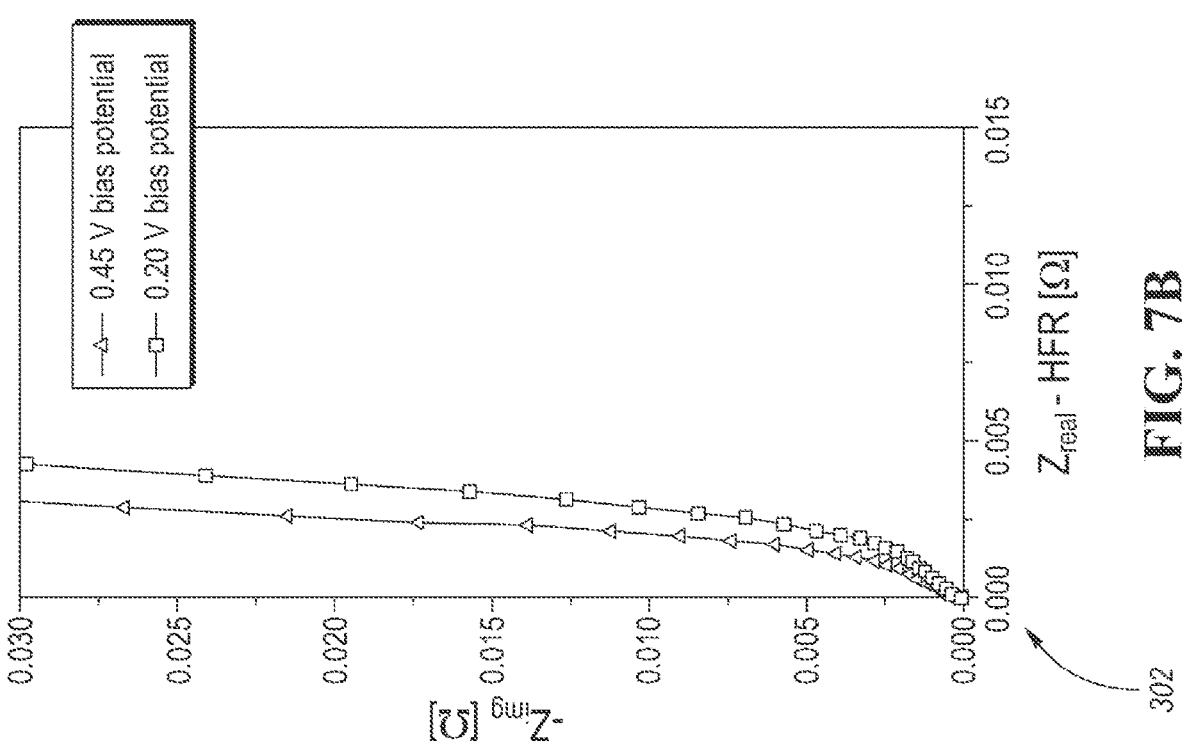
FIG. 7B depicts a graph showing measurements of an end-of-life electrode with a platinum depletion layer.
Figure 7A:
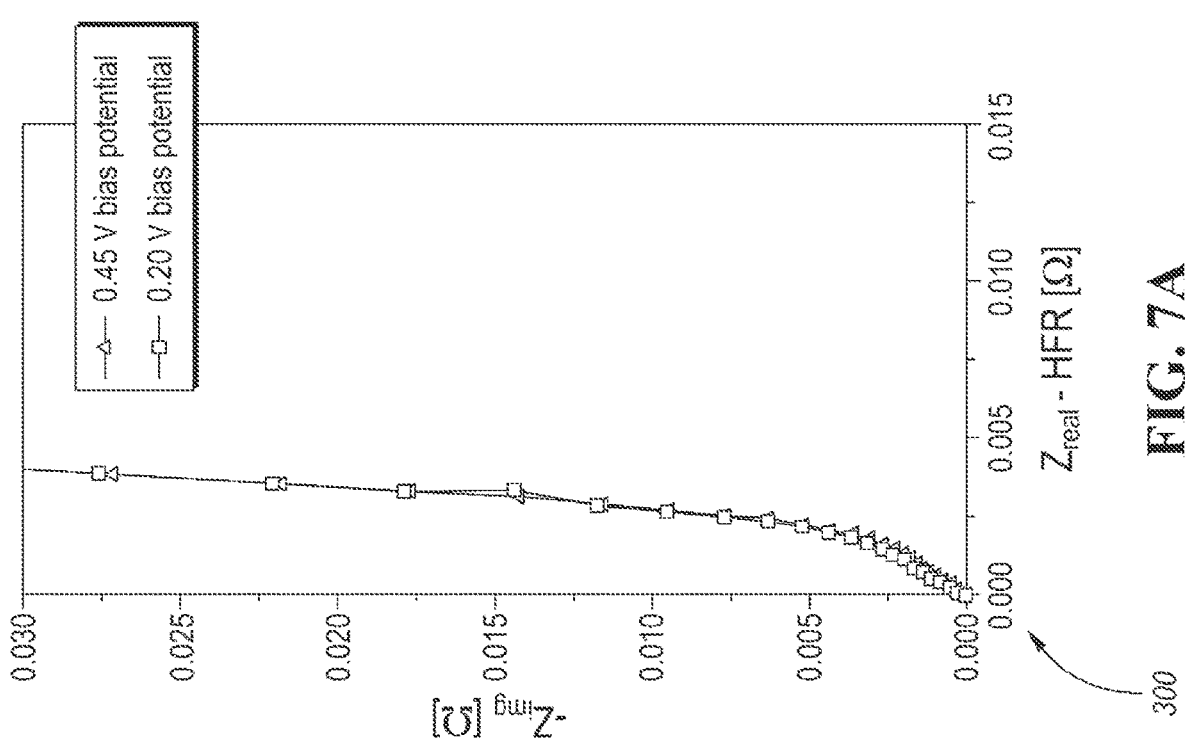
FIG. 7A depicts a graph showing measurement at a beginning-of-life homogeneous electrode.

In one or more embodiments, to verify this behavior, $R_P$ was measured for a commercial MEA at beginning-of-life and after 28,500 square wave load cycles between 0.6 and 1.0V at 90° C., 90% relative humidity in $H_2$/air atmosphere as shown in FIGS. 7A and 7B. These conditions represent a standard degradation acceleration tool for inducing platinum dissolution and redeposition. FIG. 7A depicts graph 300 showing measurements at a beginning-of-life homogeneous electrode. FIG. 7B depicts graph 302 showing measurements of an end-of-life electrode with a platinum depletion layer. The potentiostatic impedance spectra of a commercial electrode is recorded under $H_2/N_2$ conditions at beginning-of-life (FIG. 7A) and 30,000 load cycles (FIG. 7B). The platinum depletion layer formed during the load cycling resulted in a bias of the $R_P$ measurement at end-of-life depending on the measurement condition. As expected, the formation of a platinum depletion layer during load cycling resulted in a dependence of the $R_P$ measurement on the measurement conditions (e.g., the contribution of platinum to the observed capacitance of the system, while at beginning-of-life no such bias was observed).

In one or more embodiments, the impedance measurements experienced by applying first and second potentials may be performed after a first number of operating cycles and a second number of operating cycles to determine when a degradation state timing (e.g., when the degradation occurs) (or more than two points during the lifetime of the fuel cell). One of the benefits of such a process is to take corrective action in the fuel cell stack before the degradation state emerges.

The processes, methods, or algorithms (e.g., detecting the target molecules in response to one or more electrical properties of the first and second oxidation current profiles and the first and second reduction current profiles) disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell degradation monitoring method comprising:

applying first and second bias potentials to an electrode of an electrochemical cell during an operating state thereof;

measuring impedance spectra of the electrode of the electrochemical cell during the operating state biased to the first and second bias potentials;

determining a deviation in the impedance spectra at the first and second bias potentials; and determining a degradation state of the electrode of the electrochemical cell in response to the deviation in the first and second impedance spectra at the first and second bias potentials of the electrode of the electrochemical cell.

2. The electrochemical cell degradation monitoring method of claim 1, wherein the first and second bias potentials are different.

3. The electrochemical cell degradation monitoring method of claim 1, wherein the first and second bias potentials are the same.

4. The electrochemical cell degradation monitoring method of claim 1, wherein the electrochemical cell is a fuel cell.

5. The electrochemical cell degradation monitoring method of claim 4, wherein the electrode is a cathode.

6. The electrochemical cell degradation monitoring method of claim 4, wherein the degradation state is a depleted catalyst region in the electrode of the fuel cell.

7. The electrochemical cell degradation monitoring method of claim 1, wherein the electrode is supported by a support, and the degradation state is corrosion of the support.

8. The electrochemical cell degradation monitoring method of claim 1, wherein the electrode includes an ionomer, and the degradation state is degradation of the ionomer.

9. The electrochemical cell degradation monitoring method of claim 1, wherein the measuring step is carried out using an electrochemical impedance spectroscopy (EIS) based technique.

10. The electrochemical cell degradation monitoring method of claim 1, wherein the applying step is carried out using a direct current/direct current (DC/DC) converter.

11. The electrochemical cell degradation monitoring method of claim 1, wherein the applying step includes sending first and second alternating current (AC) signals to the electrochemical cell, the first and second AC signals representing the first and second bias potentials, respectively.

12. The electrochemical cell degradation monitoring method of claim 1, wherein a proton resistance of the electrode is a proton sheet resistance indicative of a through-plane proton transport of the electrode.

13. The electrochemical cell degradation monitoring method of claim 12, wherein the step of determining a deviation in the impedance spectra includes determining the deviation from a forty-five-degree (45°) section in the impedance spectra according to a transition line model for the electrode.

14. The electrochemical cell degradation monitoring method of claim 13, wherein the transition line model includes resistance contributions homogeneously distributed in the through-plane proton transport of the electrode at a beginning-of-life state of the electrode.

15. The electrochemical cell degradation monitoring method of claim 14, wherein the deviation is a change from a proton sheet resistance at the beginning-of-life state of the electrode.

16. The electrochemical cell degradation monitoring method of claim 1, wherein the first bias potential is 0.3V to 0.65V and the second bias potential is below 0.3V or above 0.65V.

17. The electrochemical cell degradation monitoring method of claim 1, wherein the operating state is one or more maintenance cycles and/or one or more normal operating cycles.

18. An electrochemical cell degradation monitoring method comprising:

applying first and second bias potentials to an electrode of an electrochemical cell during an operating state at a first number of cycles;

measuring impedance spectra of the electrode of the electrochemical cell during the operating state biased to the first and second bias potentials;

determining a first characteristic of the impedance spectra at the first and second bias potentials;

applying the first and second bias potentials to the electrode of the electrochemical cell during the operating state at a second number of cycles;

measuring the impedance spectra of the electrode of the electrochemical cell during the operating state biased to the first and second bias potentials;

determining a second characteristic of the impedance spectra at the first and second bias potentials; and determining a degradation state timing of the electrode of the electrochemical cell in response to the first and second characteristics.

19. The electrochemical cell degradation monitoring method of claim 18, wherein the second number of cycles is greater than the first number of cycles.

20. An electrochemical cell degradation monitoring system comprising:

an electrochemical cell including an electrode;

a direct current/direct current (DC/DC) converter configured to apply first and second bias potentials to the electrode of the electrochemical cell during an operating state thereof, and an electrochemical impedance spectrometer configured to measure impedance spectra of the electrode of the electrochemical cell during the operating state biased to the first and second bias potentials, wherein a deviation in the impedance spectra at the first and second bias potentials are indicative of a degradation state of the electrode.

21. The electrochemical cell degradation monitoring system of claim 20, wherein the electrochemical cell is a fuel cell, and the degradation state is a depleted catalyst region in the electrode of the fuel cell.

22. The electrochemical cell degradation monitoring system of claim 20, wherein the electrochemical cell is an electrolyzer, and the degradation state is a depleted catalyst region in the electrode of the electrolyzer.

\* \* \* \* \*